(12) United States Patent
Saito et al.

(10) Patent No.: US 8,096,393 B2
(45) Date of Patent: Jan. 17, 2012

(54) BREAKDOWN PREVENTIVE DEVICE OF ROTARY DAMPER

(75) Inventors: Takahiro Saito, Suita (JP); Hideaki Takahashi, Yokohama (JP)

(73) Assignee: Nifco Inc., Kanagawa (JP)

( * ) Notice: Subject to any disclaimer, the term of this patent is extended or adjusted under 35 U.S.C. 154(b) by 652 days.

(21) Appl. No.: 12/225,725

(22) PCT Filed: Dec. 28, 2006

(86) PCT No.: PCT/JP2006/326403
§ 371 (c)(1),
(2), (4) Date: Nov. 24, 2008

(87) PCT Pub. No.: WO2007/116574
PCT Pub. Date: Oct. 18, 2007

(65) Prior Publication Data
US 2009/0266660 A1    Oct. 29, 2009

(30) Foreign Application Priority Data
Mar. 31, 2006 (JP) .................................. 2006-097053

(51) Int. Cl.
*F16D 57/00* (2006.01)
(52) U.S. Cl. ..................... 188/290; 188/293; 4/246.2
(58) Field of Classification Search .............. 188/290, 188/293, 296, 306, 307, 378; 16/54, 82, 16/85; 4/246.2, 246.1, 240, 241, 248, 236
See application file for complete search history.

(56) References Cited

U.S. PATENT DOCUMENTS

| 5,010,601 | A | * | 4/1991 | Kobayashi et al. | 4/236 |
| 5,193,228 | A | * | 3/1993 | Murasawa et al. | 4/236 |
| 5,255,396 | A | * | 10/1993 | Miyahara et al. | 4/246.2 |
| 5,664,286 | A | * | 9/1997 | Sorimachi | 16/54 |
| 5,742,949 | A | * | 4/1998 | Goldi et al. | 4/246.2 |
| 6,182,301 | B1 | * | 2/2001 | Krueger et al. | 4/248 |
| 6,393,624 | B1 | * | 5/2002 | Iwashita | 4/248 |
| 7,416,063 | B2 | * | 8/2008 | Araki et al. | 188/296 |

FOREIGN PATENT DOCUMENTS

| EP | 1413794 A2 | * | 4/2004 |
| JP | H05-052228 | | 3/1993 |
| JP | H10-331895 | | 12/1998 |
| JP | 2002-048126 | | 2/2002 |

* cited by examiner

*Primary Examiner* — Pamela Rodriguez
(74) *Attorney, Agent, or Firm* — Manabu Kanesaka

(57) ABSTRACT

In the breakdown preventive mechanism of a rotary damper, when the upper rotor is rotated in one direction, a communication path is formed between the valve body and the lower rotor, and the pressure in the pressure chamber is formed between the lower rotor and the lower housing is lowered, and rotation is easily performed. When the upper rotor is rotated in another direction, the viscous fluid does not flow between the valve body and the lower rotor, and the pressure in the pressure chamber formed between the lower rotor and the lower housing is raised. As a result, the viscous fluid pushes down the relief valve and a cage type relief valve by resisting the elastic element, and thereby prevents breakdown of the rotary damper.

8 Claims, 11 Drawing Sheets

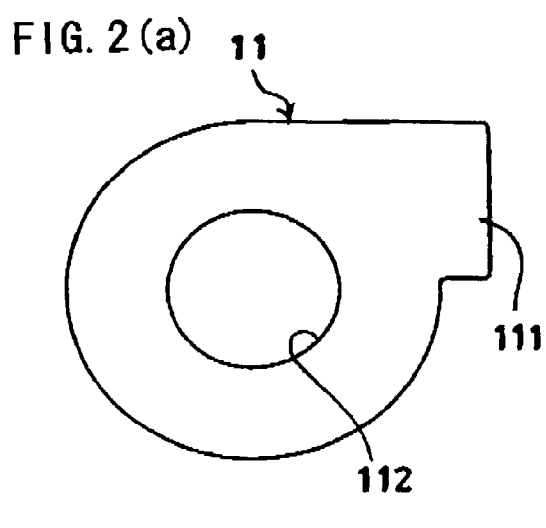
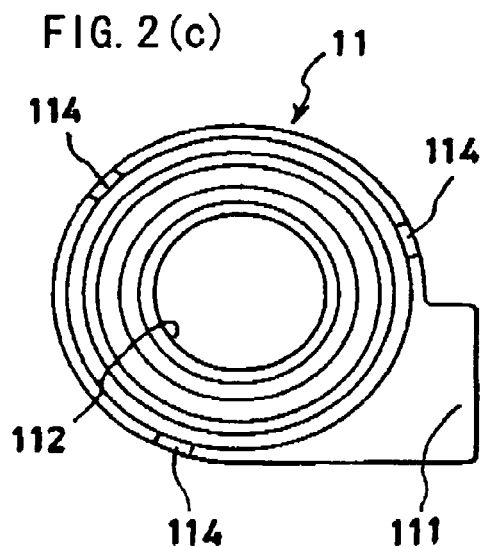
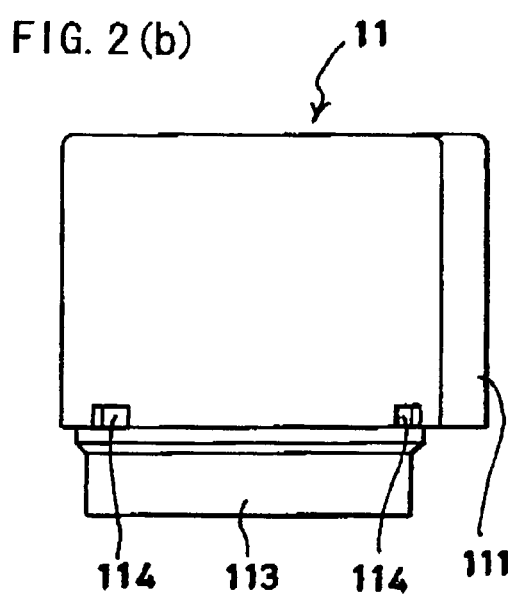
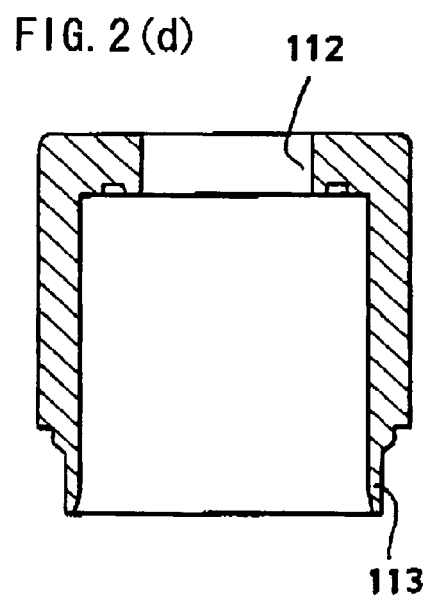

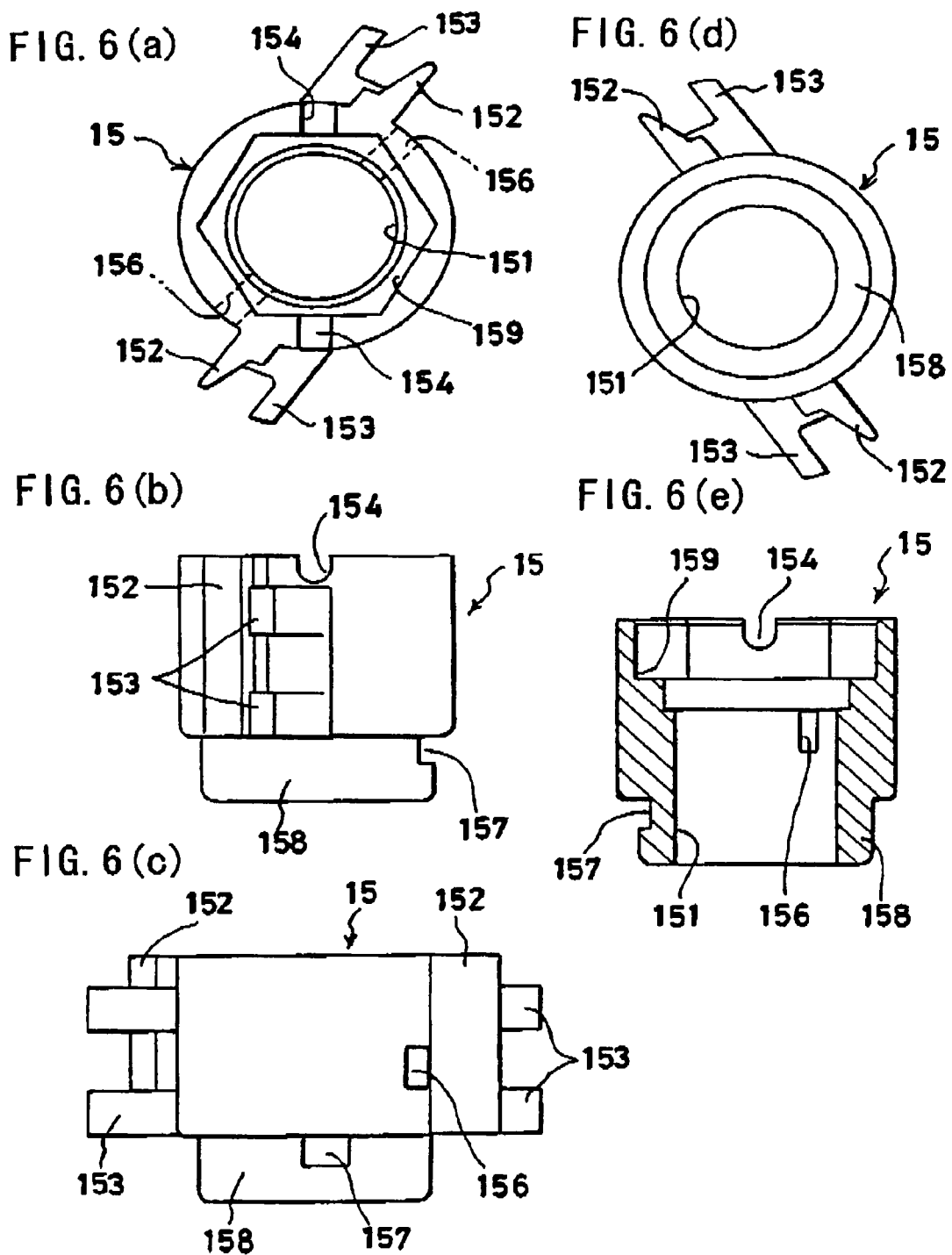

BREAKDOWN PREVENTIVE DEVICE OF ROTARY DAMPER

TECHNICAL FIELD

The present invention relates to a breakdown preventive mechanism (device) of a rotary damper, which is easy to open, for preventing the rotary damper from being broken down when a damping force is applied in closing motion, and a force more than specified is applied. The invention more particularly relates to a breakdown preventive mechanism of a rotary damper used on a rotary shaft of a toilet seat used in warm water washing device or the like, and capable of controlling easily the turning force in opening or closing of the toilet lid or toilet seat.

BACKGROUND ART

FIG. 13 is an explanatory diagram of a conventional rotary damper. The rotary damper in FIG. 13 includes a cylinder 1391 providing mutually confronting support parts 13911, a rotary shaft 1392 supported by the support parts 13911, 13911' and being free to rotate by a specified angle, and providing communication paths 13921, 13921' at both leading ends, and control valves 1393, 1393' having a nearly U-shape form and provided at internal confronting positions of the cylinder 1391, and freely fitted with a leading end of the rotary shaft 1392. The control valves 1393, 1393' are provided with control openings 13931, 13931' at one side of nearly U-shape form, and control walls 13932, 13932' at positions confronting the control openings 13931, 13931'. The cylinder 1391, having the confronting support parts 13911, 13911', the leading end of the rotary shaft 1392, and the control walls 13932, 13932', composes a decompression chamber 13941, a pressurizing chamber 13942, a decompression chamber 13943, and a pressurizing chamber 13944 (in clockwise direction) (the rotating direction of the rotary shaft 1392 is the counterclockwise direction in the drawing).

Suppose the rotary shaft 1392 rotates counterclockwise as indicated by the arrow, the leading end of the rotary shaft 1392 contacts with the control walls 13932, 13932' of the cylinder 1391, and the pressure is raised in the adjacent pressurizing chambers 13942, 13944. On the other hand, the rotary shaft 1392 rotates in the opposite direction of the arrow (clockwise) In this case, the leading end of the rotary shaft 1392 is departed from the control walls 13932, 13932'. As a result, the decompression chambers 13941, 13943 are decompressed as the oil flows out through the communication paths 13921, 13921' and the control openings 13931, 13931' provided at the leading end of the rotary shaft 1392. The detail of the rotary damper is described, for example, in Japanese Patent Publication No. 2882109.

There was a problem that the conventional rotary damper was thin in the wall thickness of the rotary shaft 1392, the communication paths 13921, 13921', the control valves 1393, 1393', the control openings 13931, 13931', and the control walls 13932, 13932', and was poor in durability, and could not withstand a large load. To solve the problem, there was a problem that the rotary damper must be increased in thickness or size of the entire structure. For example, the toilet seat or toilet lid must be installed in a predetermined narrow place, and a reduced diameter was expected but it was not realized. Besides, the rotary damper used in the toilet seat or toilet lid is used by unspecified people, such as guests or children, not knowing how to increase or decrease the applying force, and if an excessive force is applied accidentally when closing, there was no rotary damper to withstand sufficient intensity.

To solve these problems, it is hence an object of the invention to present a breakdown preventive mechanism (device) of a rotary damper, reduced in the size of the rotary damper, and capable of preventing from breaking down if a force more than specified is applied.

DISCLOSURE OF THE INVENTION

First Invention

The breakdown preventive mechanism of a rotary damper is characterized in that at least consisting in the first invention is small in the force against a rotary motion in one direction, and generates a damping force against a rotary motion in the other direction, and thereby prevents from breaking down when a load of high torque is generated, and specifically it includes at least an upper housing, an upper rotor freely rotating within the upper housing, providing a first pressure transmission hole in the lower part, and being forced downward, a lower housing provided in the upper housing, and having a viscous fluid sealed at the lower part of the upper rotor, a lower rotor freely coupled in the lower housing along rotation of the upper rotor, and providing a second pressure transmission hole communicating with the first pressure transmission hole, and a relief hole for allowing the viscous fluid to escape from the positive pressure side to the negative pressure side, a valve body mounted on the lower rotor, and allowing the viscous fluid to escape from the positive pressure side to the negative pressure side depending on the rotating direction of the lower rotor, a relief valve moving downward by the pressure of the viscous fluid flowing in from the first and second pressure transmission holes, and a cage type relief valve supporting the relief valve and being forced to the upper rotor side.

Second Invention

In the breakdown preventive mechanism of a rotary damper of the second invention is characterized in that the relief valve and the relief valve are movable in the axial direction as the viscous fluid is compressed by rotation of the upper rotor.

Third Invention

In the breakdown preventive mechanism or a rotary damper of the third invention is characterized in that an elastic element is provided between the relief valve and the lower rotor of the first invention or the second invention.

Fourth Invention

In the breakdown preventive mechanism of a rotary damper of the fourth invention is characterized in that the valve body of the first invention to the third invention has a valve opening force adjusting function by means of the communication paths and the control walls provided in the lower rotor.

Fifth Invention

In the breakdown preventive mechanism of a rotary damper of the fifth invention is characterized in that the relief valve of the first invention to the fourth invention is supported in the axial direction by a coil spring.

Sixth Invention

In the breakdown preventive mechanism of a rotary damper of the sixth invention is characterized in that the valve body of the first invention to the fifth invention is supported so as to be rotatable by means of the lower rotor.

Seventh Invention

In the breakdown preventive mechanism of a rotary damper of the seventh invention is characterized in that the relief valve and the relief valve of the first invention to the sixth invention are movable in the axial direction by the pressure of the viscous fluid flowing in through the first and second pressure transmission holes when a strong rotating force more than specified is applied to the upper rotor.

According to the invention, the force when the viscous fluid passes the first and second pressure transmission holes, and the force of the viscous fluid pushing down by resisting the elastic element supporting the relief valve and the relief valve act both in axial direction, and not only the rotary damper can be reduced in diameter, but also breakdown due to force more than specified can be prevented. The viscous fluid is not compressed but flows from the positive pressure side to the negative pressure side by the relief valve and the relief valve, and breakdown is avoided if a pressure more than specified is applied.

According to the invention, the breakdown preventive mechanism of a rotary damper is designed to apply the force of the viscous fluid opposite to the spring in axial direction rather than to the radial direction, and the entire constitution is reduced in diameter, and if installed in a narrow space of a toilet seat or toilet lid, or if an excessive force is applied, it is not broken down structure.

According to the invention, if a load of high torque more than a specified value is generated, the rotary damper is not broken down by the breakdown preventive mechanism. The breakdown preventive mechanism of a rotary damper of the invention is composed of a plurality of mechanical elements such as upper rotor, relief valve, relief valve, lower rotor, and valve body, and the force of the viscous fluid is transmitted in the axial direction, and is also allowed to escape in the radial direction, and the entire strength is maintained without increasing the strength of individual mechanical elements, and the entire size is compact at the same time. That is, the breakdown preventive mechanism of a rotary damper of the invention is designed to receive a force more than specified applied to the rotary damper by distributing into multiple mechanical elements without one mechanical element receiving the force, and breakdown can be prevented easily.

BRIEF DESCRIPTION OF THE DRAWINGS

FIG. 2(a) is a plan view of an upper housing of a breakdown preventive mechanism of a rotary damper in FIG. 1;

FIG. 2(b) is a side view of an upper housing of a breakdown preventive mechanism of a rotary damper in FIG. 1;

FIG. 2(c) is a bottom view of an upper housing of a breakdown preventive mechanism of a rotary damper in FIG. 1;

FIG. 2(d) is a sectional view of an upper housing of a breakdown preventive mechanism of a rotary damper in FIG. 1;

FIG. 6(a) is a plan view of a lower rotor of a breakdown preventive mechanism of a rotary damper in FIG. 1;

FIG. 6(b) is a side view of a lower rotor of a breakdown preventive mechanism of a rotary damper in FIG. 1;

FIG. 6(c) is a side view seen from a different direction of a lower rotor of a breakdown preventive mechanism of a rotary damper in FIG. 1;

FIG. 6(d) is a bottom view of a lower rotor of a breakdown preventive mechanism of a rotary damper in FIG. 1;

FIG. 6(e) is a sectional view of a lower rotor of a breakdown preventive mechanism of a rotary damper in FIG. 1;

BEST MODE FOR CARRYING OUT THE INVENTION

First Invention

Figure 1:
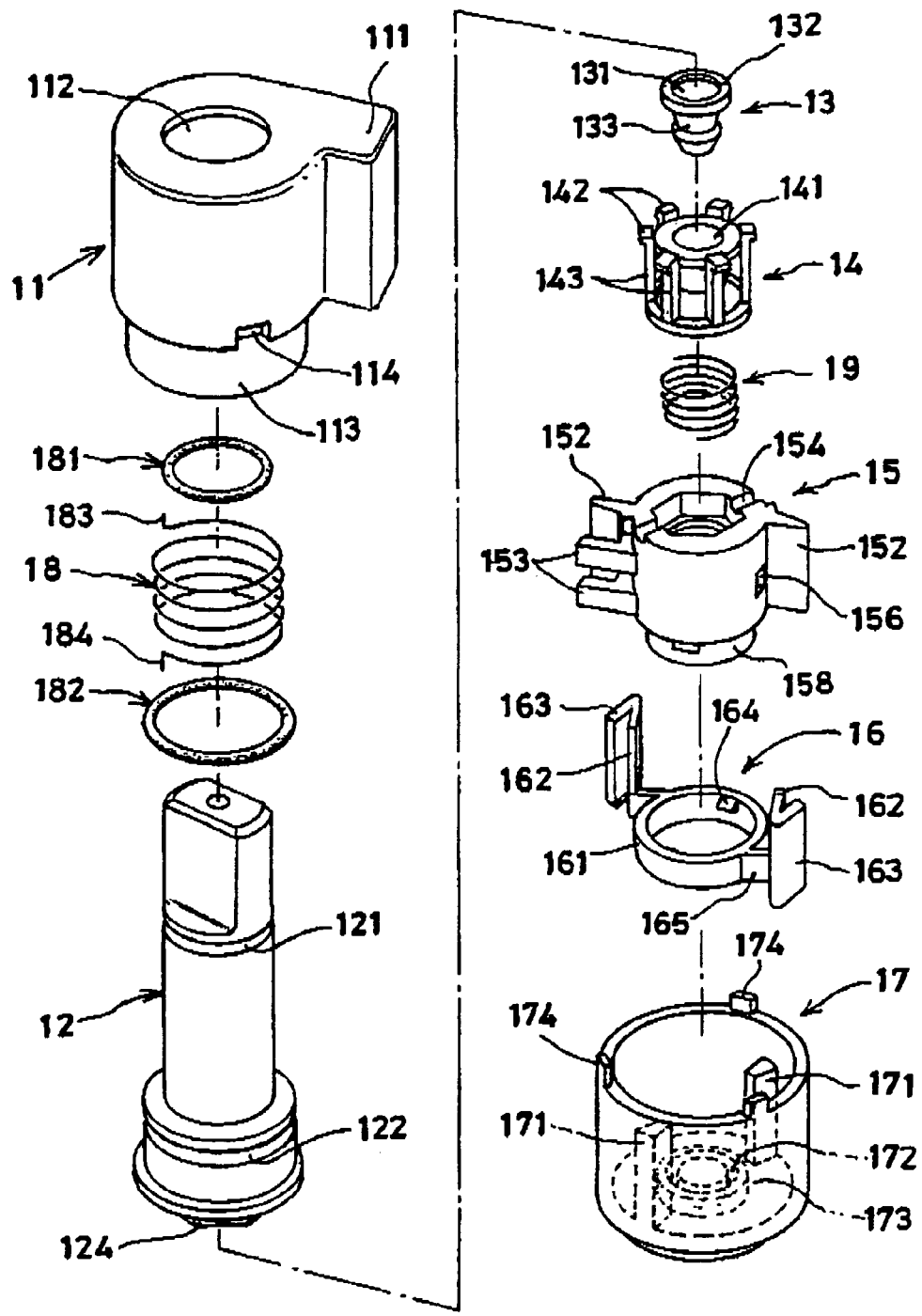
FIG. 1 is a perspective view for explaining an assembling method of a breakdown preventive mechanism of a rotary damper in an embodiment of the invention.
Figure 3A:
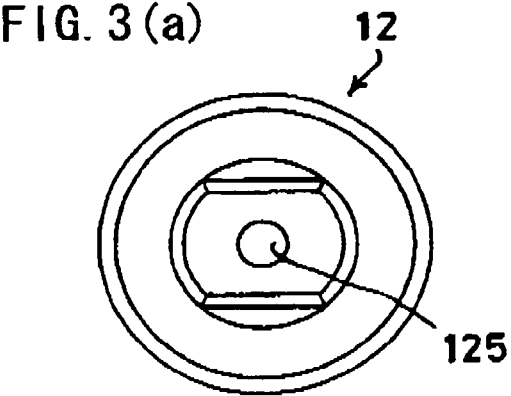
FIG. 3(a) is a plan view of an upper rotor of a breakdown preventive mechanism of a rotary damper in FIG. 1.
Figure 3C:
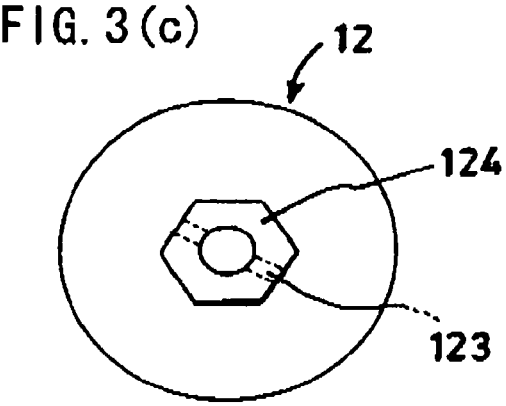
FIG. 3(c) is a bottom view of an upper rotor of a breakdown preventive mechanism of a rotary damper in FIG. 1.
Figure 3B:
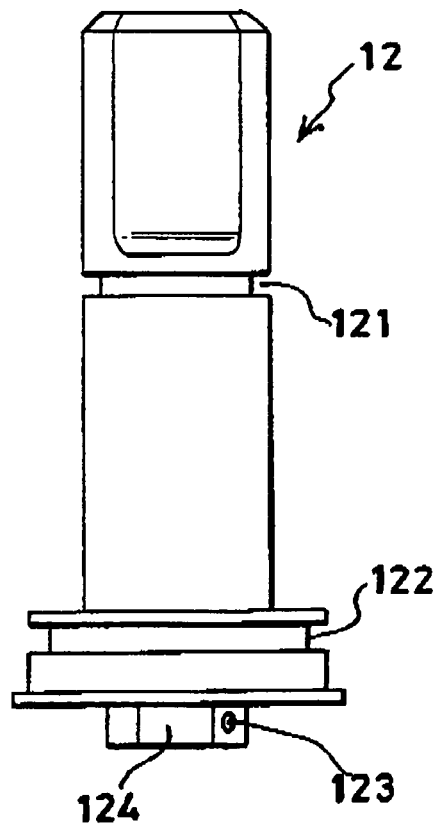
FIG. 3(b) is a side view of an upper rotor of a breakdown preventive mechanism of a rotary damper in FIG. 1.
Figure 3D:
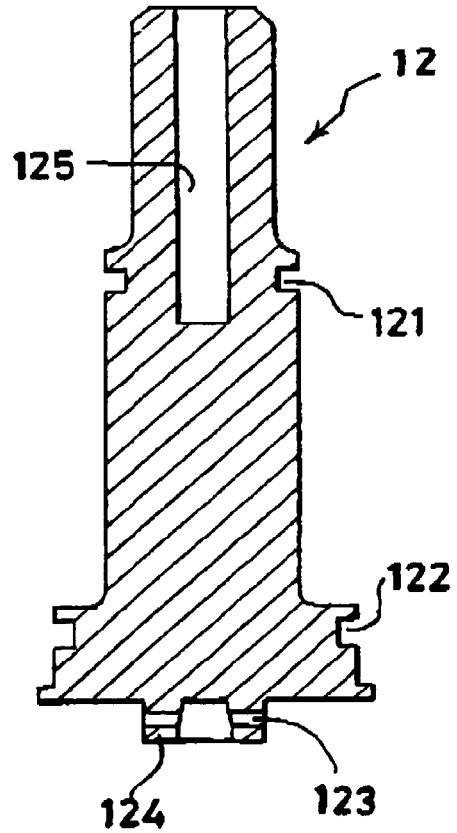

The breakdown preventive mechanism (device) of a rotary damper in the first invention is small in the force against a rotary motion in one direction, and generates a damping force against a rotary motion in another direction, and the rotary damper is prevented from breaking down when a load of high torque is generated. The breakdown preventive mechanism of a rotary damper provides an upper housing providing an upper rotor, and a lower housing coupled to the upper housing. The inside of the upper housing provides an upper rotor rotated by rotary motion. In the inside of the lower housing, a lower rotor, a valve body, a relief valve, and a relief valve are assembled and inserted. The upper rotor is free to rotate in the upper housing, and a first pressure transmission hole is provided in the lower part, and the force in rotating direction is supported by a spring, for example, a torsion spring. The lower rotor is assembled in the lower housing, and a viscous fluid is sealed between the lower rotor and the lower part of the lower housing.

The lower rotor is freely coupled in the lower housing along rotation of the upper rotor so as to rotate at specified angle, and has a second pressure transmission hole communicating with the first pressure transmission hole. The valve body is mounted on the lower rotor, and is flexible, and by the rotating direction of the lower rotor and the viscosity of the viscous fluid, it is a structure to allow escaping from the positive pressure side to the negative pressure side. The relief valve moves downward (in axial direction) by receiving the pressure of the viscous fluid flowing in from the first and second pressure transmission holes. The relief valve supports the relief valve by the elastic element, and is forced to the upper rotor side.

In the breakdown preventive mechanism of a rotary damper, when the upper rotor is rotated and moved in one direction, a communication path is formed between the valve body and the lower rotor, and the pressure is lowered in a pressure chamber formed between the lower rotor and the lower housing, and it is easy to rotate. The breakdown preventive mechanism of a rotary damper arrests circulation of viscous fluid between the valve body and the lower rotor when the upper rotor is rotated in other direction, and thereby the pressure is elevated in the pressure chamber formed between the lower rotor and the lower housing.

As a result, the viscous fluid passes the first and second pressure transmission holes, and pushes down the relief valve and the relief valve by resisting the elastic element. The force when the viscous fluid passes the first and second pressure transmission holes, and the force of the viscous fluid pushing down by resisting the elastic element supporting the relief valve and the relief valve act to prevent breakdown of the rotary damper. The breakdown preventive mechanism of a rotary damper is designed so that the force of the viscous fluid may be opposite more strongly to the elastic element in the axial direction rather than to the radial direction, and the entire constitution may be formed in a smaller diameter.

Second Invention

In the breakdown preventive mechanism of a rotary damper of the second invention, by rotation of the upper rotor of the first invention, the relief valve and the relief valve are moved in the axial direction by the force of the viscous fluid passing the first and second pressure transmission holes. The relief valve and the relief valve are moved in the axial direction by rotation of the upper rotor, and thereby prevent breakdown of the rotary damper, so that the breakdown preventive mechanism of a rotary damper can be reduced in diameter.

Third Invention

An elastic element is provided between the relief valve and the lower rotor, and a specified force is held between the upper rotor and the relief valve. When the upper rotor is rotated in the other direction, the specified force generates a damping force against the rotor motion in the other direction. The specified force, when exceeding the damping force, pushes the relief valve in the axial direction, and the viscous fluid escapes from the clearance of the upper rotor and the relief valve, and thereby breakdown of the rotary damper is prevented.

Fourth Invention

In the breakdown preventive mechanism of a rotary damper of the fourth invention, the valve body provided in the lower rotor, and the communication paths and the control walls provided in the outer circumference lower rotor compose a valve opening force adjusting function. The valve body compresses the viscous fluid in the lower housing while contacting with the control walls, decompresses the viscous fluid in the lower housing while existing at the communication path side. The valve opening force adjusting function is achieved effectively by the friction between the valve body having a flexible property, and the inner circumference of the lower housing.

Fifth Invention

In the breakdown preventive mechanism of a rotary damper of the fifth invention, the relief valve has a cylindrical cage shape, and is supported in the axial direction by a coil spring. The relief valve is preferably provided in a portion for accommodating the coil spring at the back side of the portion for accommodating the relief valve.

Sixth Invention

In the breakdown preventive mechanism of a rotary damper of the sixth invention, the valve body is mounted in the lower part of the lower rotor, and by rotating the lower rotor, a valve mechanism is composed together with the control wall or the communication path provided on the circumference of the lower rotor.

Seventh Invention

In the breakdown preventive mechanism of a rotary damper of the seventh invention, when a strong rotating force more than specified is applied to the upper rotor, the pressure of the viscous fluid flowing through the first and second pressure transmission holes is applied to the upper parts of the relief valve and the relief valve, thereby moving in the axial direction. The breakdown preventive mechanism of a rotary damper of the invention is thus designed to move the viscous fluid in the axial direction, and is hence reduced in diameter.

The invention is more specifically described below according to the accommodating drawings.

FIG. 1 is a perspective view for explaining an assembling method of a breakdown preventive mechanism of a rotary damper in an embodiment of the invention. In FIG. 1, a rotary damper is composed by assembling an upper housing 11, an upper rotor 12, a relief valve 13, a relief valve 14, a lower rotor 15, a valve body 16, and a lower housing 17 sequentially as shown in the drawing. The upper rotor 12 is sealed to the upper housing 11 by means of a first O-ring 181 and a second O-ring 182, and a torsion spring 18 is provided between the each O-rings, and it is forced downward by the torsion spring 18. The relief valve 14 is provided in the lower rotor 15 so as to be forced upward by an elastic element 19. The vertical direction of the rotary damper relates to the drawing, and the direction may be changed to horizontal direction or the like, depending on the state of installation. The torsion spring 18 may be fixed to maintain the force in the rotating direction by engaging an engaging part 183 with an engagement hole not shown in the upper housing 11, or by engaging other engaging part 184 with an engagement hole not shown in the upper rotor 12.

FIG. 2 shows an embodiment of the invention, in which (a) is a plan view of upper housing, (b) is a side view of upper housing, (c) is a bottom view of upper housing, and (d) is a sectional view of upper housing. In FIG. 2(a) to (d), the upper housing 11 is provided with, at its side, a device fixing part 111 for mounting the toilet seat or valve lid or the like, an upper rotor receiving port 112 for inserting the upper rotor 12, a lower housing mounting part 113 for mounting the lower housing 17 downward, and a lower housing mounting recess part 114 so as not to be departed when the lower housing 17 is mounted. The lower housing 17 is after fitted to the upper housing 11 of the lower housing mounting part 113, and the protrusion portion of the lower housing 17 is fitted or fused to the lower housing mounting recess part 114, so that the assembly is fixed.

FIG. 3 shows an embodiment of the invention, in which (a) is a plan view of upper rotor, (b) is a side view of upper rotor, (c) is a bottom view of upper rotor, and (d) is a sectional view of upper rotor. In FIG. 3(a) to (d), the upper rotor 12 includes a first O-ring insertion groove 121 for fitting the first O-ring 181, a second O-ring insertion groove 122 for fitting the second O-ring 182, a lower rotor mounting part 124 of, for example, hexagonal shape having a first pressure transmission hole 123 in the lower part, and a thin wall part 125.

Figure 4:
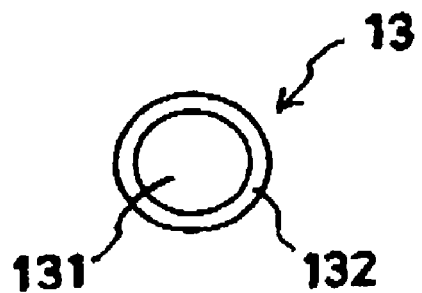
FIG. 4(a) is a plan view of a relief valve of a breakdown preventive mechanism of a rotary damper in FIG. 1.
FIG. 4(b) is a side view of a relief valve of a breakdown preventive mechanism of a rotary damper in FIG. 1.
FIG. 4(c) is a bottom view of a relief valve of a breakdown preventive mechanism of a rotary damper in FIG. 1.
FIG. 4(d) is a sectional view of a relief valve of a breakdown preventive mechanism of a rotary damper in FIG. 1.
Figure 4:
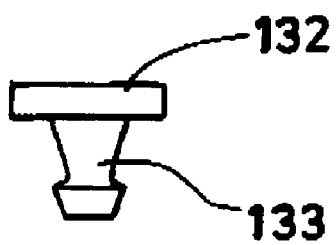
Figure 4:
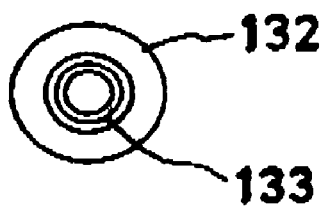
Figure 4:
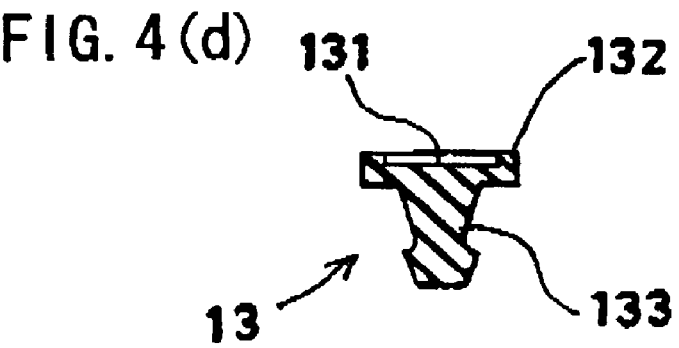
Figure 5A:
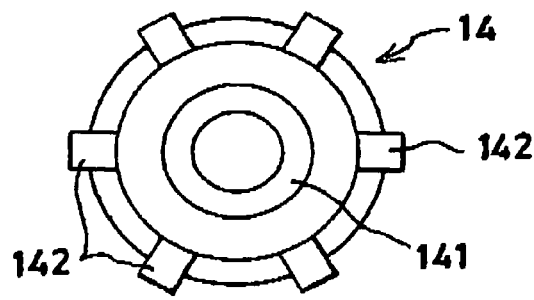
FIG. 5(a) is a plan view of a relief valve of a breakdown preventive mechanism of a rotary damper in FIG. 1.
Figure 5B:
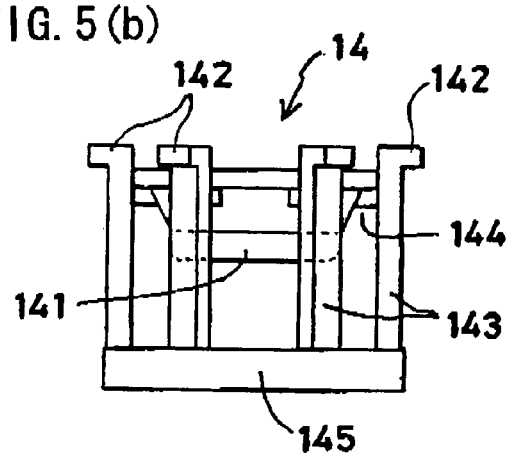
FIG. 5(b) is a side view of a relief valve of a breakdown preventive mechanism of a rotary damper in FIG. 1.
Figure 5D:
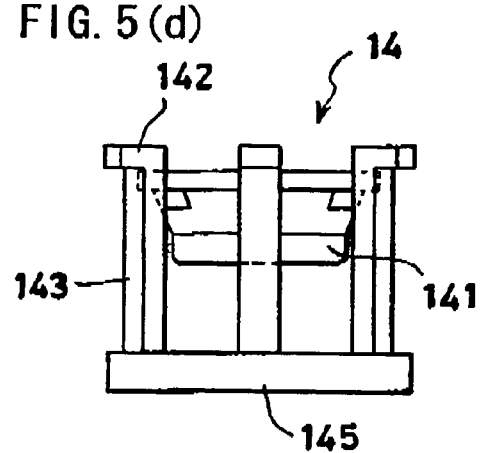
FIG. 5(d) is a side view seen from a different direction of a relief valve of a breakdown preventive mechanism of a rotary damper in FIG. 1.
Figure 5C:
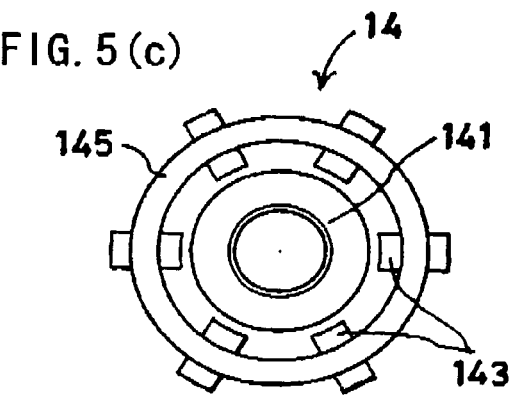
FIG. 5(c) is a bottom view of a relief valve of a breakdown preventive mechanism of a rotary damper in FIG. 1.
Figure 5E:
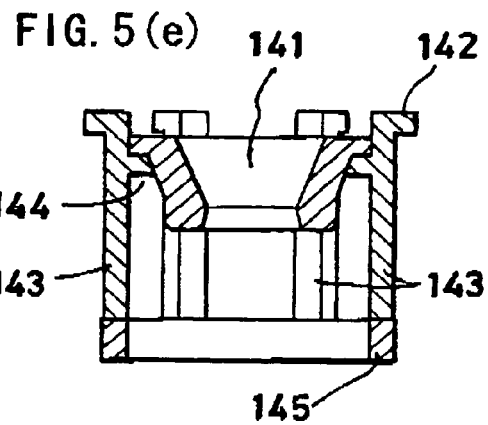
FIG. 5(e) is a sectional view of a relief valve of a breakdown preventive mechanism of a rotary damper in FIG. 1.

FIG. 4 shows an embodiment of the invention, in which (a) is a plan view of relief valve, (b) is a side view of relief valve, (c) is a bottom view of relief valve, and (d) is a sectional view of relief valve. In FIG. 4(a) to (d), the relief valve 13 includes an upper rotor receiving part 131 in the upper center, a flange 132 provided around the upper rotor receiving part 131, and a mounting part 133 to be mounted on the relief valve 14 mentioned below.

FIG. 5 shows an embodiment of the invention, in which (a) is a plan view of relief valve, (b) is a side view of relief valve, (c) is a bottom view of relief valve, (d) is a side view as seen from a different direction of relief valve, and (e) is a sectional view of relief valve. In FIG. 5(a) to (e), the relief valve 14 includes a relief valve mounting part 141 of conical shape, a plurality of sliding ribs 143 having wrong assembly preventive pawls 142 provided at the leading end of the relief valve mounting part 141 so as to project in the circumferential direction, and a lower ring 145 attached to the sliding ribs 143, and is formed in a cage shape. The relief valve mounting part 141 of conical shape is formed in a shape so that the relief valve 13 can be fitted easily. The relief valve mounting part 141, sliding ribs 143, and lower ring 145 may be formed either separately or integrally. The sliding ribs 143 provided in the inside of the lower rotor 15, and formed in a shape easy to slide vertically (in axial direction) against the elastic element 19.

FIG. 6 shows an embodiment of the invention, in which (a) is a plan view of lower rotor, (b) is a side view of lower rotor, (c) is a side view as seen from a different direction of lower rotor, (d) is a bottom view of lower rotor, and (e) is a sectional view of lower rotor. In FIG. 6(a) to (e), the lower rotor 15 includes a relief valve inserting part 151 provided inside, control walls 152 and communication paths 153 provided symmetrically at both sides, second pressure transmission holes 154 provided symmetrically in the upper part, a relief hole 156 for releasing the internal viscous fluid, a mounting recess part 157 and a valve body mounting part 158 for mounting the valve body 16 in the lower part, and a fitting part 159 for fitting with the upper rotor 12. The control walls 152 and communication paths 153 have a length in the depth direction of the lower rotor 15 so as to perform valve action together with the valve body 16 described below. The relief hole 156 is symmetrically provided at the decompression chamber side, and releases the viscous fluid to the lower housing 17. The fitting part 159 is, for example, formed in a hexagonal recess part, in which the upper rotor 12 is fitted, so as to be rotated by the rotation of the upper rotor 12.

Figure 7A:
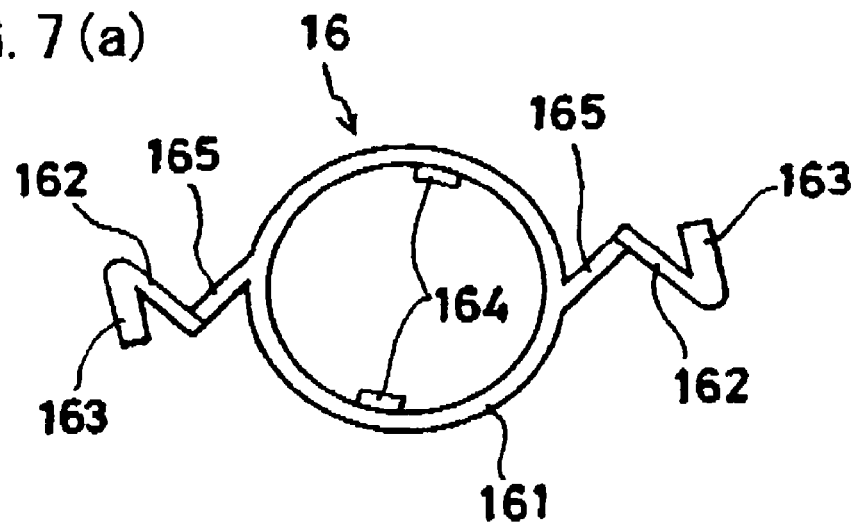
FIG. 7(a) is a plan view of a valve body of a breakdown preventive mechanism of a rotary damper in FIG. 1.
Figure 7B:
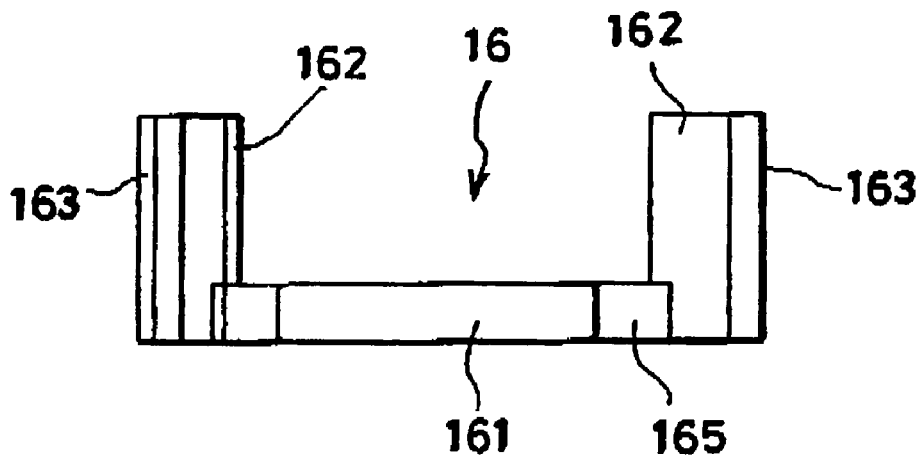
FIG. 7(b) is a side view of a valve body of a breakdown preventive mechanism of a rotary damper in FIG. 1.
Figure 7C:
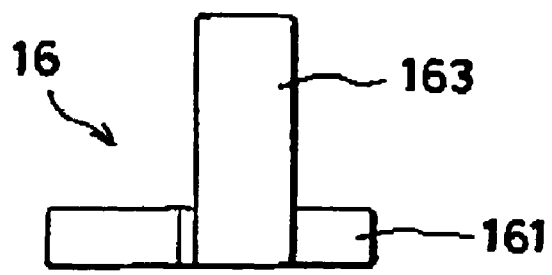
FIG. 7(c) is a side view as seen from a different direction of a valve body of a breakdown preventive mechanism of a rotary damper in FIG. 1.

FIG. 7 shows an embodiment of the invention, in which (a) is a plan view of valve body, (b) is a side view of valve body, and (c) is a side view as seen from a different direction of valve body. In FIG. 7(a) to (c), the valve body 16 includes a mounting part 161 of annular shape to be fitted to the lower part of the lower rotor 15 provided downward, control surface 162 and communication surface 163 provided on levers 165 extending sideward symmetrically from the mounting part 161 and extending upward, and a mounting bump part 164 to be fitted to the mounting recess part 157 of the lower rotor 15. The control surface 162 and communication surface 163 are formed nearly in a shape of approximately FIG. "7" in the sectional view, and the longer side contacts flatly with the control walls 152, and one end the shorter side contacts with the inner all of the lower housing 17. The control sides 162 and communication sides 163 have a length in the depth direction of the lower rotor 15.

Figure 8A:
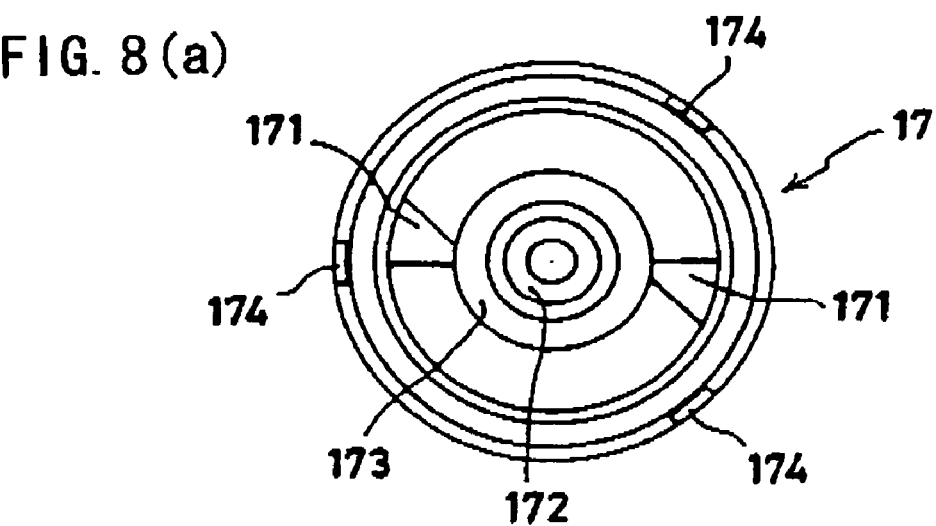
FIG. 8(a) is a plan view of a lower housing of a breakdown preventive mechanism of a rotary damper in FIG. 1.
Figure 8B:
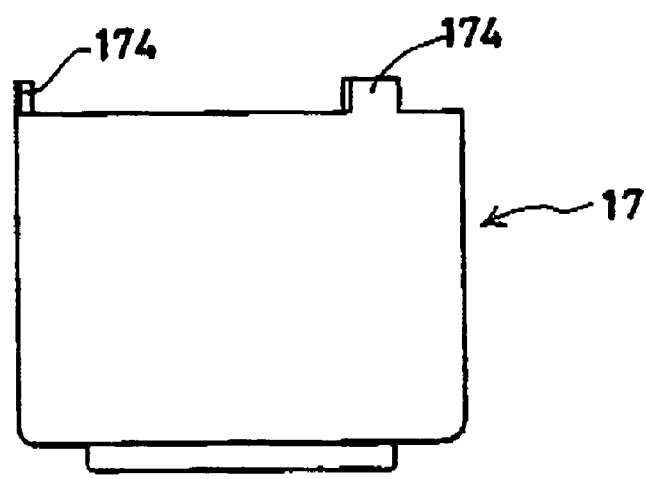
FIG. 8(b) is a side view of a lower housing of a breakdown preventive mechanism of a rotary damper in FIG. 1.
Figure 8C:
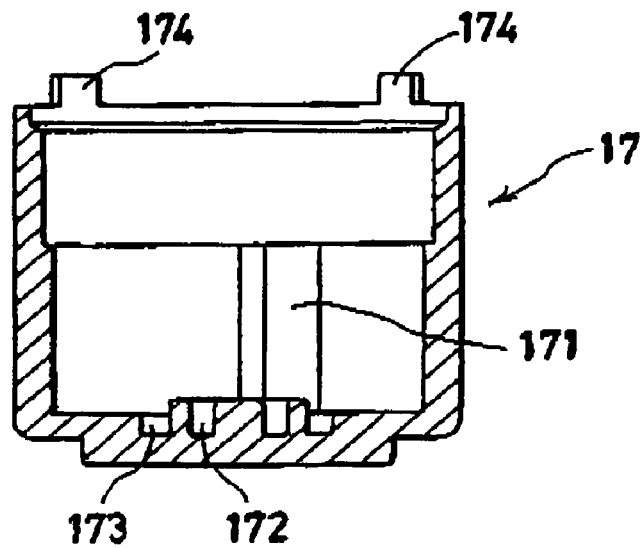
FIG. 8(c) is a sectional view of a lower housing of a breakdown preventive mechanism of a rotary damper in FIG. 1.

FIG. 8 shows an embodiment of the invention, in which (a) is a plan view of lower housing, (b) is a side view of lower housing, and (c) is a sectional view of lower housing. In FIG. 8(a) to (c), the lower housing 17 accommodates the relief valve 13, relief valve 14, lower rotor 15, and valve body 16, and also includes a stopper 171, a spring mounting groove 172, a lower rotor mounting groove 173, and a mounting bump part 174 fitted to a lower housing mounting recess part 114 provided in the lower part of the upper housing 11. The stopper 171 is intended to prevent over-rotation of the lower rotor 15.

Figure 9:
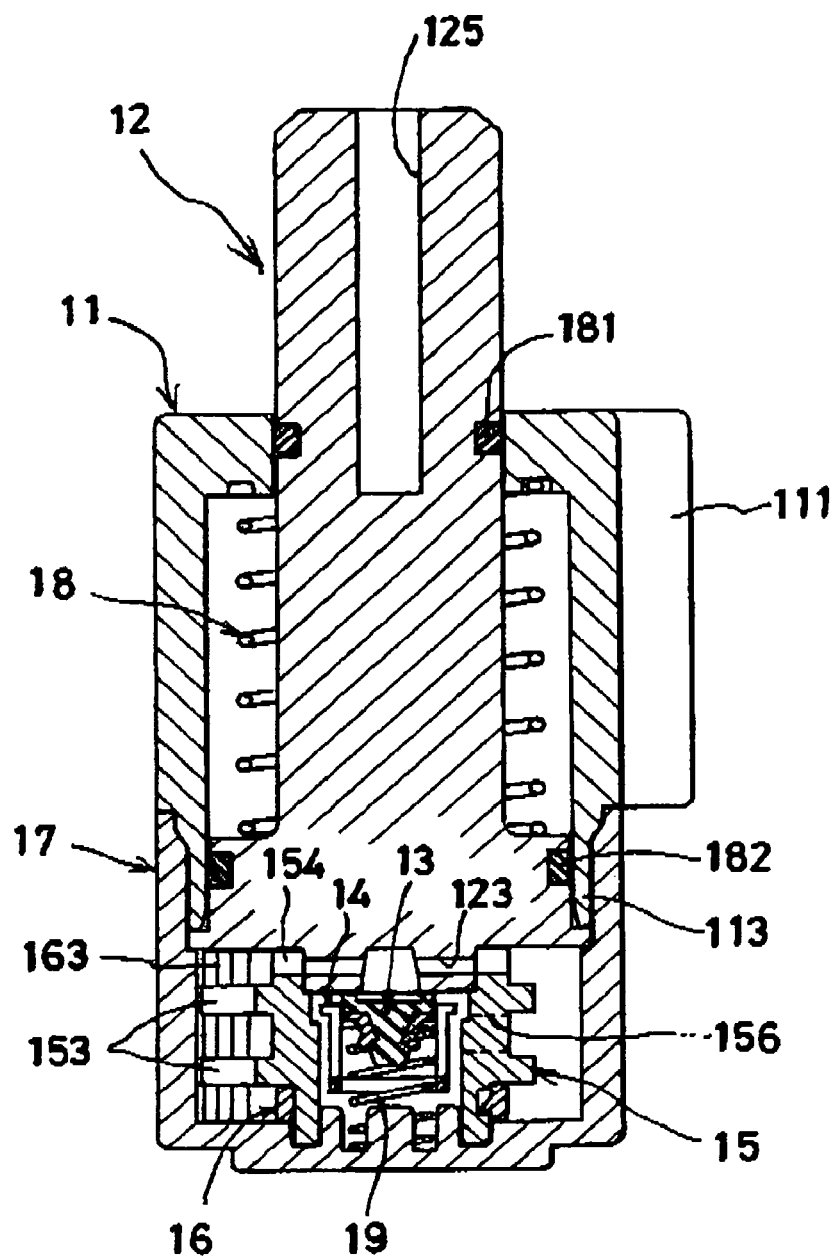
FIG. 9 is a sectional view of an assembled state showing an embodiment of a rotary damper of the invention.

FIG. 9 is an explanatory diagram of assembled state of rotary damper in an embodiment of the invention. In FIG. 9, the rotary damper is assembled of the upper housing 11, upper rotor 12, relief valve 13, relief valve 14, lower rotor 15, valve body 16, lower housing 17 or the like. In the state shown in FIG. 9, the pressure of the elastic element 19 is strong, and the relief valve 13 is contacting with the downside of the upper rotor 12.

Figure 10:
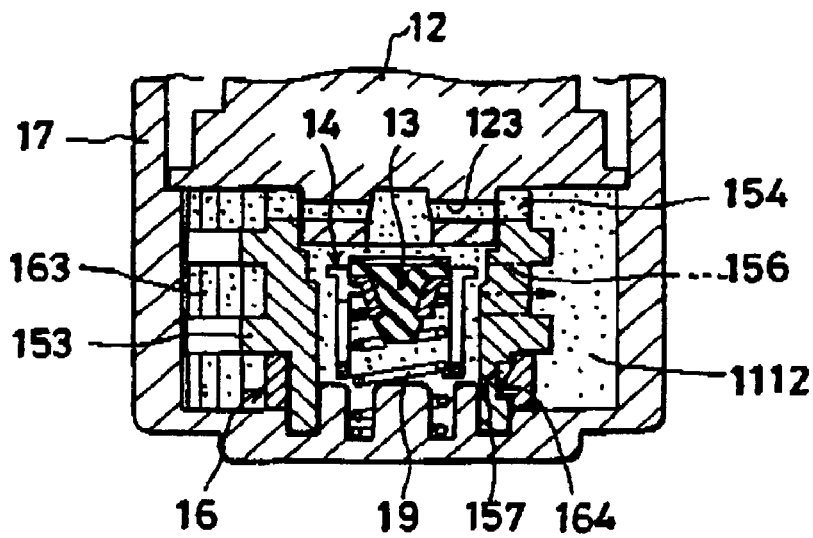
FIG. 10 is an explanatory diagram of an lower housing of a breakdown preventive mechanism of a rotary damper of the invention.

FIG. 10 is an explanatory diagram of breakdown preventive mechanism of a rotary damper in an embodiment of the invention. In the breakdown preventive mechanism of a rotary damper shown in FIG. 10, the pressure of the viscous fluid flowing in from the first pressure transmission hole 123 and the second pressure transmission hole 154 is in state more than the pressure of the elastic body 19, and the viscous fluid escapes in the radial direction of the lower housing 17, and thereby breakdown is prevented.

Figure 11:
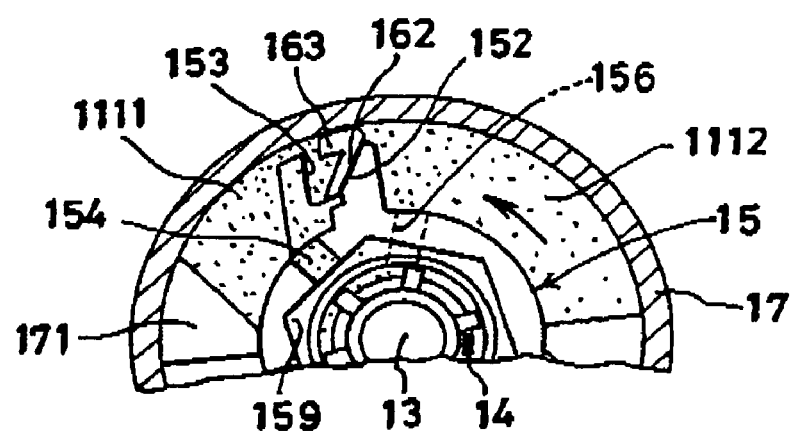
FIG. 11 is an explanatory diagram of a valve body state when the upper rotor is rotated counterclockwise in the rotary damper of the invention.

FIG. 11 is an explanatory diagram of valve body state when the upper rotor is rotated counterclockwise in an embodiment of the invention. In FIG. 11, when the upper rotor 12 is rotated counterclockwise, the control face 162 of the valve body 16 contacts with the control wall 152 of the lower rotor 15, and the pressure of the viscous fluid in the pressurization chamber 1111 is raised. The viscous fluid in the pressurization chamber 1111 passes through the second pressure transmission hole 154 and the first pressure transmission hole 123 (see FIG. 10), and pushes down the relief valve 13 (in axial direction). The pressure in the axial direction overcomes the force of the elastic element 19, for example, the coil spring, and pushes down the relief valve 13 and the relief valve 14 (in axial direction) (to be in the state shown in FIG. 10), and the viscous fluid in the pressurization chamber 1111 is allowed to flow in the direction of the decompression chamber 1112, and thereby the pressure more than the specified value is lessened, and the breakdown of the rotary damper is prevented.

Figure 12:
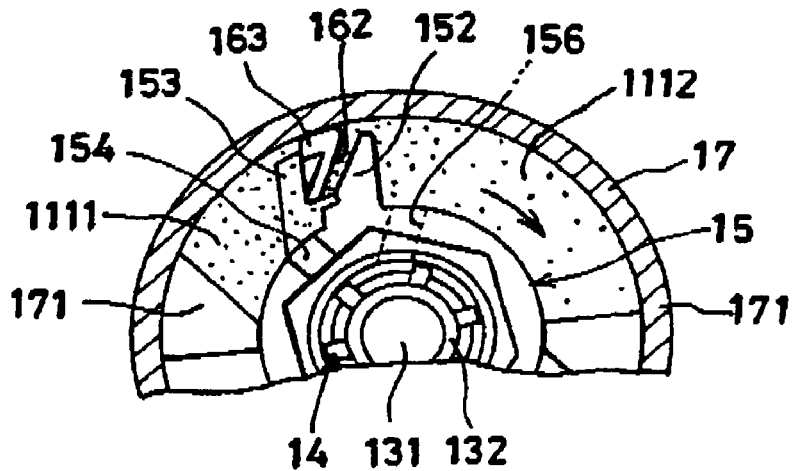
FIG. 12 is an explanatory diagram of a valve body state when the upper rotor is rotated clockwise in the rotary damper of the invention.
Figure 13:
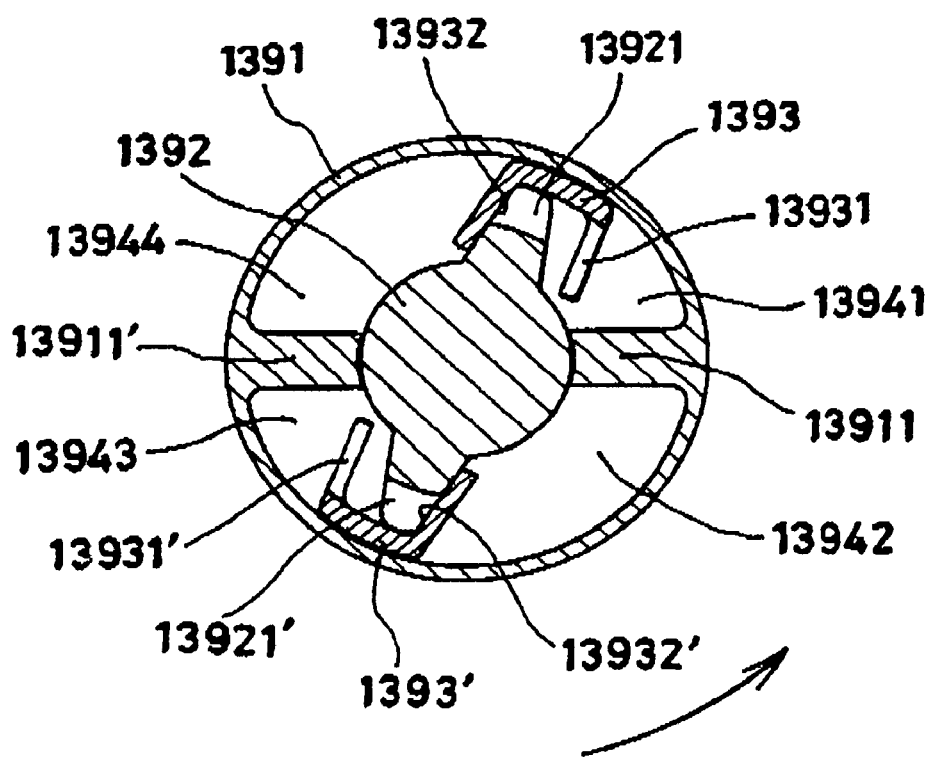
FIG. 13 is an explanatory diagram of a conventional rotary damper.

FIG. 12 is an explanatory diagram of valve body state when the upper rotor is rotated clockwise in an embodiment of the invention. In FIG. 12, when the upper rotor 12 is rotated clockwise, the control face 162 of the valve body 16 is separated from the control wall 152 of the lower rotor 15, and the viscous fluid in the pressurization chamber 1111 flows in the direction of the decompression chamber 1112, and the pressure in the pressurization chamber 1111 is lowered. Thus, in the breakdown preventive mechanism of a rotary damper of the invention, since it is designed to transmit the pressure of the viscous fluid in the axial direction, the diameter is reduced and the size is also reduced. In the rotary damper of the invention, since the relief valve 13, relief valve 14, lower rotor 15, and valve body 16 are individually operated by the viscous fluid, if the strength of the individual mechanical elements is weak, a force more than specified can be distributed.

INDUSTRIAL APPLICABILITY

Embodiments of the invention are described above, but the invention is not limited to these embodiments. The invention may be changed or modified without departing from the true spirit and the scope of the claims of the invention. The mechanical elements for composing the parts in FIG. 1 to FIG. 12 may be changed in material or shape to known or well known configuration. The embodiments relate to the toilet seat and toilet lid, the invention may be applied to other appliances and devices.

The invention claimed is:

1. A breakdown preventive mechanism of a rotary damper having a small force against a rotary motion in one direction, and generating a damping force against a rotary motion in another direction, and said breakdown preventive mechanism preventing from breaking down when a load of high torque is generated, comprising:
    an upper housing,
    an upper rotor freely rotating within the upper housing, having a first pressure transmission hole in a lower part of the upper rotor, and being forced downward,
    a lower housing mounted in the upper housing, and having a viscous fluid sealed between the lower housing and the lower part of the upper rotor,
    a lower rotor freely coupled in the lower housing along rotation of the upper rotor, and having a second pressure transmission hole communicating with the first pressure transmission hole, and a relief hole for allowing the viscous fluid to escape from a positive pressure side to a negative pressure side,
    a valve body mounted on the lower rotor, and allowing the viscous fluid to escape from the positive pressure side to the negative pressure side depending on a rotating direction of the lower rotor,
    a relief valve moving downward by a pressure of the viscous fluid flowing in from the first and second pressure transmission holes, and
    a cage type relief valve supporting the relief valve and being forced to an upper rotor side.

2. The breakdown preventive mechanism of the rotary damper of claim 1, wherein the relief valve and the cage type relief valve are movable in an axial direction as the viscous fluid is compressed by rotation of the upper rotor.

3. The breakdown preventive mechanism of the rotary damper of claim 2, wherein an elastic element is provided between the relief valve and the lower rotor.

4. The breakdown preventive mechanism of the rotary damper of claim 1, wherein an elastic element is provided between the relief valve and the lower rotor.

5. The breakdown preventive mechanism of the rotary damper of claim 1, wherein the valve body has a valve opening force adjusting function by means of communication paths and control walls provided in the lower rotor.

6. The breakdown preventive mechanism of the rotary damper of claim 1, wherein the cage type relief valve is supported in an axial direction by a coil spring.

7. The breakdown preventive mechanism of the rotary damper of claim 1, wherein the valve body is supported so as to be rotatable by means of the lower rotor.

8. The breakdown preventive mechanism of the rotary damper of claim 1, wherein the relief valve and the cage type relief valve are movable in an axial direction by the pressure of the viscous fluid flowing in through the first and second pressure transmission holes when a strong rotating force more than specified is applied to the upper rotor.

* * * * *